United States Patent
Cai et al.

(10) Patent No.: US 10,370,265 B2
(45) Date of Patent: *Aug. 6, 2019

(54) WATER PURIFICATION SYSTEM

(71) Applicants: FOSHAN SHUNDE MIDEA WATER DISPENSER MFG. CO., LTD., Foshan (CN); MIDEA GROUP CO., LTD., Foshan (CN)

(72) Inventors: Xuegang Cai, Foshan (CN); Lei Liu, Foshan (CN); Xingzhi Zhang, Foshan (CN)

(73) Assignees: FOSHAN SHUNDE MIDEA WATER DISPENSER MFG. CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,100

(22) Filed: Jul. 31, 2017

(65) Prior Publication Data

US 2017/0349454 A1 Dec. 7, 2017

Related U.S. Application Data

(63) Continuation of application No. PCT/CN2015/078085, filed on Apr. 30, 2015.

(30) Foreign Application Priority Data

Jan. 30, 2015 (CN) .......................... 2015 1 0053709
Jan. 30, 2015 (CN) ..................... 2015 2 0071240 U

(51) Int. Cl.
  *B01D 61/58* (2006.01)
  *C02F 1/28* (2006.01)
  (Continued)

(52) U.S. Cl.
  CPC .............. *C02F 1/28* (2013.01); *B01D 61/025* (2013.01); *B01D 61/027* (2013.01); *B01D 61/04* (2013.01);
  (Continued)

(58) Field of Classification Search
  CPC .... B01D 61/025; B01D 61/027; B01D 61/04; B01D 61/58; B01D 2311/2649;
  (Continued)

(56) References Cited

U.S. PATENT DOCUMENTS

2010/0266742 A1* 10/2010 Ferreira ............... B01D 5/0015
                                                         426/477

FOREIGN PATENT DOCUMENTS

CN      201848153 U      6/2011
CN      102910752 A  *   8/2012
(Continued)

OTHER PUBLICATIONS

CN 102910752A USPTO Human Translation, 2017, 45 pages.*
(Continued)

*Primary Examiner* — Patrick J Orme
(74) *Attorney, Agent, or Firm* — Morgan, Lewis & Bockius LLP

(57) ABSTRACT

A water purification system includes: a composite filter cartridge including a pretreatment filter cartridge and a filter membrane assembly; a raw water inlet pipe; a pure water outlet pipe; a pretreated water pipe; a booster pump; a water quality detecting device disposed to the raw water inlet pipe and/or the pure water outlet pipe and configured to detect water quality in the raw water inlet pipe and the pure water outlet pipe; and a control device connected to the water quality detecting device and configured to determine service life of the composite filter cartridge and/or judge whether the (Continued)

composite filter cartridge has lost efficacy according to information detected by the water quality detecting device.

5 Claims, 2 Drawing Sheets

(51) Int. Cl.
*C02F 1/44* (2006.01)
*B01D 61/02* (2006.01)
*B01D 61/04* (2006.01)
*B01D 61/08* (2006.01)
*B01D 61/12* (2006.01)
*B01D 61/14* (2006.01)
*C02F 1/00* (2006.01)

(52) U.S. Cl.
CPC ............. *B01D 61/08* (2013.01); *B01D 61/12* (2013.01); *B01D 61/145* (2013.01); *B01D 61/147* (2013.01); *B01D 61/58* (2013.01); *C02F 1/44* (2013.01); *C02F 1/441* (2013.01); *C02F 1/442* (2013.01); *C02F 1/444* (2013.01); *B01D 2311/04* (2013.01); *B01D 2311/06* (2013.01); *B01D 2313/50* (2013.01); *C02F 1/001* (2013.01); *C02F 1/283* (2013.01); *C02F 2209/005* (2013.01); *C02F 2209/05* (2013.01); *C02F 2209/445* (2013.01)

(58) Field of Classification Search
CPC ............ B01D 2313/50; B01D 2319/02; B01D 2319/06; C02F 1/441; C02F 1/444; C02F 1/50; C02F 2209/40
See application file for complete search history.

(56) References Cited

FOREIGN PATENT DOCUMENTS

| | | | |
|---|---|---|---|
| CN | 102910752 A | | 2/2013 |
| CN | 203269679 U | | 11/2013 |
| CN | 103755051 A | * | 4/2014 |
| CN | 103755051 A | | 4/2014 |
| CN | 203728660 U | | 7/2014 |
| CN | 203904091 U | | 10/2014 |
| CN | 203999060 U | | 12/2014 |
| CN | 104556457 A | | 4/2015 |
| CN | 204434313 U | | 7/2015 |
| JP | 2014188465 A | | 10/2014 |

OTHER PUBLICATIONS

CN 103755051 EPO Machine Translation, 2017, 5 pages.*
Office Action, Application No. CN201510053709.2, dated Dec. 25, 2015, 14 pgs.
International Search Report and Written Opinion, PCT/CN2015/078085, dated Nov. 6, 2015, 23 pgs.

* cited by examiner

WATER PURIFICATION SYSTEM

RELATED APPLICATIONS

This application is a continuation application of PCT Patent Application No. PCT/CN2015/078085, entitled "WATER PURIFICATION SYSTEM" filed on Apr. 30, 2015, which claims priority to Chinese Patent Application No. 201510053709.2, entitled "WATER PURIFICATION SYSTEM" filed on Jan. 30, 2015 and Chinese Patent Application No. 201520071240.0, entitled "WATER PURIFICATION SYSTEM", filed on Jan. 30, 2015, all of which are incorporated by reference in their entirety.

FIELD OF THE TECHNOLOGY

The present disclosure relates to a technical field of water treatment, and more specifically to a water purification system.

BACKGROUND OF THE DISCLOSURE

In an existing water purification apparatus, polypropylene (PP) cotton, activated carbon and the like are adopted as a pre-filter cartridge, a reverse osmosis (RO) filter cartridge is connected in series, and a water system in which multi-stage filter cartridges are connected performs water purification. The service life of the multi-stage filter cartridges is inconsistent, so a consumer needs to replace three to five stages of filter cartridges. As it is required to buy the filter cartridges frequently and replace the filter cartridges by a professional installer, the consumer has bad experience, and the comprehensive cost is high.

In the assembly process, the installer is not only required to clean the filter cartridge, but also required to detect water quality of tap water so as to set the service life of different filter cartridges, so the assembly time is long and the labor cost is high.

SUMMARY

The present disclosure seeks to solve at least one of the above-mentioned technical problems to at least some extent.

Therefore, a water purification system is provided in the present disclosure, which is simple in pipeline connection and convenient to assemble and replace, and has good user experience.

The water purification system according to embodiments of the present disclosure includes: a composite filter cartridge including a pretreatment filter cartridge and a filter membrane assembly inserted into the pretreatment filter cartridge, the composite filter cartridge being provided with a raw water inlet, a pretreated water outlet, a pretreated water inlet, a pure water outlet and a waste water outlet; a raw water inlet pipe connected to the raw water inlet; a pure water outlet pipe connected to the pure water outlet; a waste water outlet pipe connected to the waste water outlet; a pretreated water pipe connected to the pretreated water outlet and the pretreated water inlet; a booster pump disposed to the pretreated water pipe; a water quality detecting device disposed to the raw water inlet pipe and/or the pure water outlet pipe and configured to detect water quality in the raw water inlet pipe and/or the pure water outlet pipe; and a control device connected to the water quality detecting device and configured to determine service life of the composite filter cartridge and/or judge whether the composite filter cartridge has lost efficacy according to information detected by the water quality detecting device.

In the water purification system according to embodiments of the present disclosure, by disposing the water quality detecting device to the raw water inlet pipe and/or the pure water outlet pipe, the water quality detecting device can determine the service life of the composite filter cartridge according to the detected water quality of the raw water, and determine whether the composite filter cartridge has lost efficacy according to the detected water quality of the pure water, so that the user can judge the use state of the water purification system better and decide whether the composite filter cartridge needs to be replaced. Thus, it is more convenient to use the composite filter cartridge, and in addition, the water purification system is simple in pipeline connection and convenient to assemble and replace, and has a high user experience.

In addition, the water purification system according to embodiments of the present disclosure may have the following additional technical features.

According to an embodiment of the present disclosure, the water quality detecting device includes a first water quality detector disposed to the raw water inlet pipe and configured to detect water quality of raw water in the raw water inlet pipe, and the control device is connected to the first water quality detector and configured to determine the service life of the composite filter cartridge according to information detected by the first water quality detector.

According to an embodiment of the present disclosure, the water quality detecting device includes a second water quality detector disposed to the pure water outlet pipe and configured to detect water quality in the pure water outlet pipe, and the control device is connected to the second water quality detector and configured to judge whether the composite filter cartridge has lost efficacy according to information detected by the second water quality detector.

According to an embodiment of the present disclosure, at least one of the first water quality detector and the second water quality detector is a conductivity sensor, and the control device is a single chip microcomputer. The conductivity sensor detects water-flow impedance and generates a frequency signal, the single chip microcomputer receives the frequency signal and determines total amount of dissolved solid materials in water flow, and the single chip microcomputer determines the service life of the composite filter cartridge or judges whether the composite filter cartridge has lost efficacy according to the total amount of dissolved solid materials.

According to an embodiment of the present disclosure, the water purification system further includes a display device connected to the control device configured to display the service life of the composite filter cartridge and/or display whether the composite filter cartridge has lost efficacy.

According to an embodiment of the present disclosure, the water purification system further includes a flexible water bag disposed to the pure water outlet pipe.

According to an embodiment of the present disclosure, the water purification system further includes a temperature detecting device connected to the water quality detecting device, configured to correct detection accuracy of the water quality detecting device.

According to an embodiment of the present disclosure, the water purification system further includes a waste water ratio control valve disposed to the waste water outlet pipe and connected to the control device.

According to an embodiment of the present disclosure, the pretreatment filter cartridge includes an outer filtration layer, a middle filtration layer and an inner filtration layer. The outer filtration layer is a PP nonwoven fabric wound layer, a folded PP nonwoven layer, a PP cotton layer or a thread-wound PP cotton layer; the middle filtration layer is an activated carbon fiber wound layer, an activated carbon rod layer, a granular activated carbon layer or a pickled activated carbon layer; and the inner filtration layer is a microfiltration layer or an ultrafiltration layer.

According to an embodiment of the present disclosure, the filter membrane assembly includes a central water collecting pipe, and a reverse osmosis membrane, an ultrafiltration membrane or a nanofiltration membrane wound upon the central water collecting pipe.

Additional aspects and advantages of embodiments of present disclosure will be given in part in the following descriptions, become apparent in part from the following descriptions, or be learned from the practice of the embodiments of the present disclosure.

Figure 1:
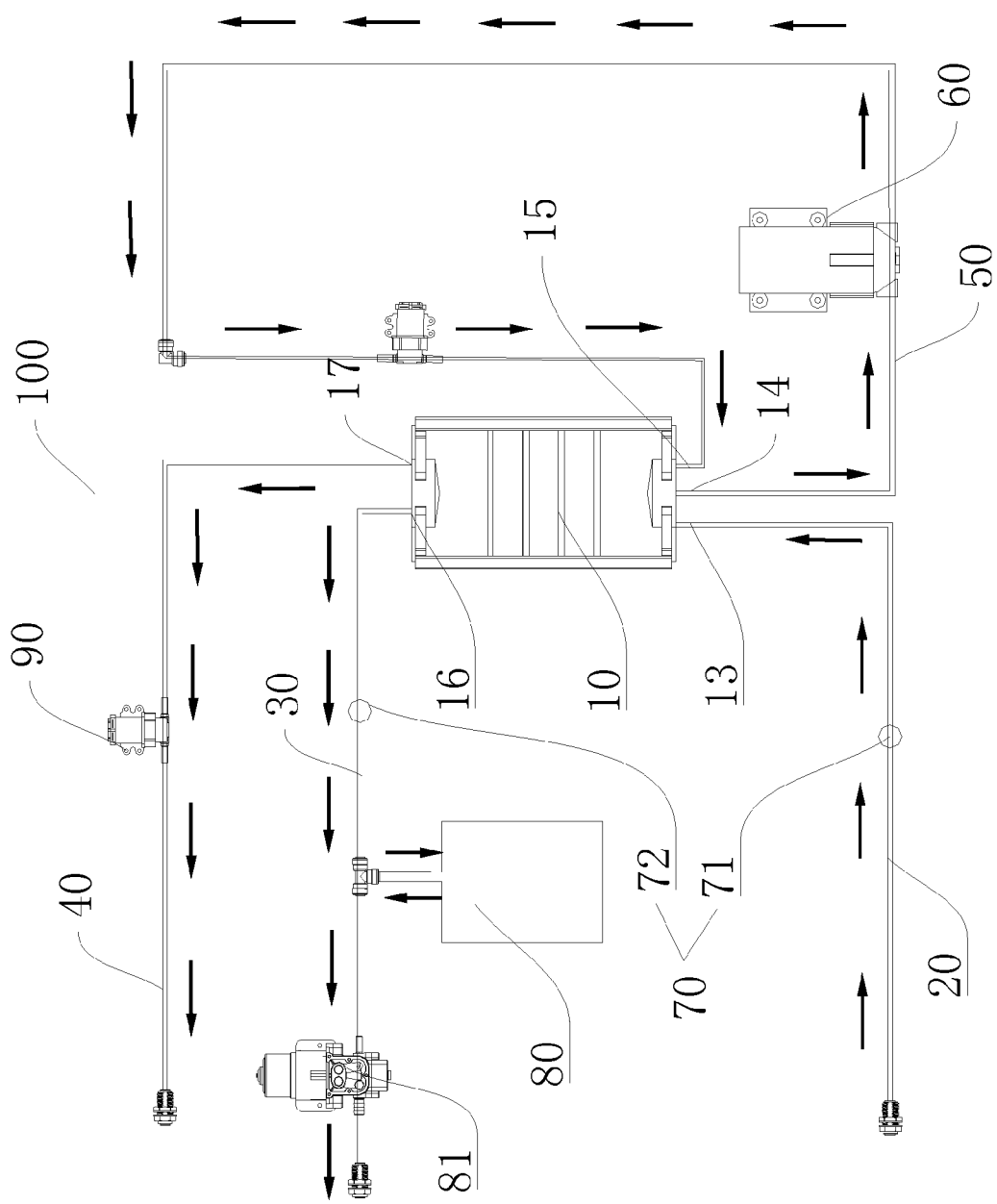
FIG. 1 is a schematic view of a water purification system according to embodiments of the present disclosure.

REFERENCE NUMERALS water purification system 100;
composite filter cartridge 10;
pretreatment filter cartridge 11;
filter membrane assembly 12;
central water collecting pipe 121;
filter membrane 122;
raw water inlet 13;
pretreated water outlet 14;
pretreated water inlet 15;
pure water outlet 16;
waste water outlet 17;
raw water inlet pipe 20;
pure water outlet pipe 30;
waste water outlet pipe 40;
pretreated water pipe 50;
booster pump 60;
water quality detecting device 70;
flexible water bag 80;
water pump 81;
waste water ratio control valve 90.

DETAILED DESCRIPTION OF EMBODIMENTS

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

A water purification system 100 according to embodiments of the present disclosure will be described specifically in combination with the accompanying drawings.

Figure 2:
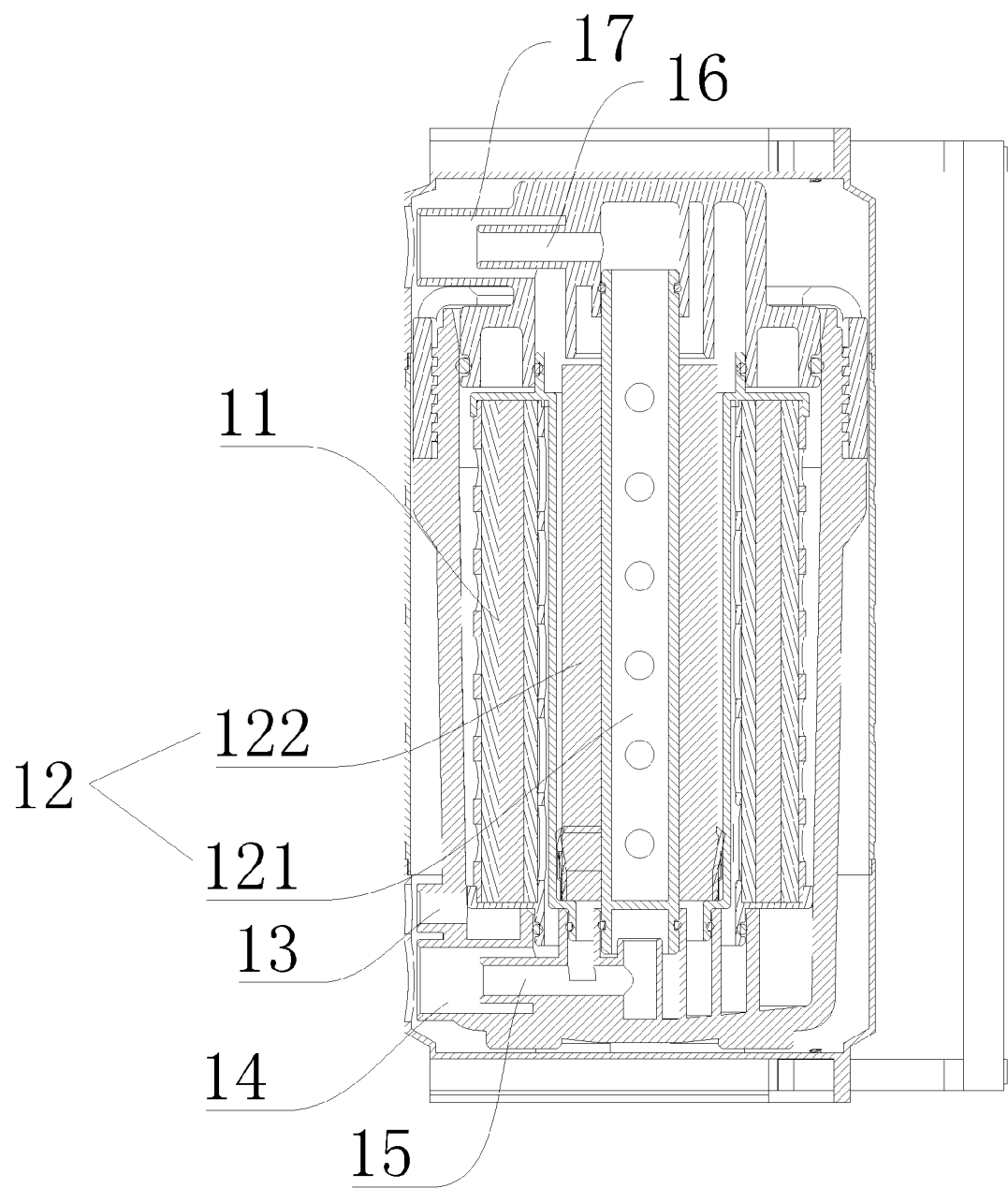
FIG. 2 is a schematic view of a composite filter cartridge of a water purification system according to embodiments of the present disclosure.

As illustrated in FIG. 1 and FIG. 2, the water purification system 100 according to embodiments of the present disclosure includes a composite filter cartridge 10, a raw water inlet pipe 20, a pure water outlet pipe 30, a waste water outlet pipe 40, a pretreated water pipe 50, a booster pump 60, a water quality detecting device 70 and a control device.

Specifically, the composite filter cartridge 10 includes a pretreatment filter cartridge 11 and a filter membrane assembly 12 inserted into the pretreatment filter cartridge 11. The composite filter cartridge 10 is provided with a raw water inlet 13, a pretreated water outlet 14, a pretreated water inlet 15, a pure water outlet 16 and a waste water outlet 17. The raw water inlet pipe 20 is connected to the raw water inlet 13, the pure water outlet pipe 30 is connected to the pure water outlet 16, and the waste water outlet pipe 40 is connected to the waste water outlet 17.

The pretreated water pipe 50 is connected to the pretreated water outlet 14 and the pretreated water inlet 15, and the booster pump 60 is disposed to the pretreated water pipe 50. The water quality detecting device 70 is disposed to the raw water inlet pipe 20 and/or the pure water outlet pipe 30, and configured to detect water quality in the raw water inlet pipe 20 and/or the pure water outlet pipe 30. The control device is connected to the water quality detecting device 70 and configured to determine service life of the composite filter cartridge 10 and/or judge whether the composite filter cartridge has lost efficacy according to information detected by the water quality detecting device 70.

In other words, the water purification system 100 according to embodiments of the present disclosure mainly includes the composite filter cartridge 10, the booster pump 60, the water quality detecting device 70 and the control device. The composite filter cartridge 10 is provide with the raw water inlet 13, the pretreated water outlet 14, the pretreated water inlet 15, the pure water outlet 16 and the waste water outlet 17. The raw water inlet pipe 20 is disposed at the raw water inlet 13, the pure water outlet pipe 30 is connected to the pure water outlet 16, and the waste water outlet pipe 40 is connected to the waste water outlet 17.

The pretreated water pipe 50 is disposed between the pretreated water outlet 14 and the pretreated water inlet 15. The raw water flows to the raw water inlet 13 through the raw water inlet pipe 20 and enters the pretreatment filter cartridge 11 from the raw water inlet 13, and pretreated water through pretreatment of the pretreatment filter cartridge flows out from the pretreated water outlet 14.

The booster pump 60 is disposed to the pretreated water pipe 50, and the pretreated water flowing out from the pretreated water outlet 14 is pumped to the pretreated water inlet 15 and further filtered by the filter membrane assembly 12, such that a water purification effect is realized. Pure water after the filtration flows to the pure water outlet pipe 30 from the pure water outlet 16 and flows out from the pure water outlet pipe 30. Waste water flows to the waste water outlet pipe 40 from the waste water outlet 17 and flows out from the waste water outlet pipe 40.

Service life of the composite filter cartridge 10 is influenced by the water quality of the raw water in some degree. When the water quality of the raw water is good, the service life of the composite filter cartridge 10 is relatively long, and when the water quality of the raw water is bad, the service life of the composite filter cartridge 10 is relatively short. When a conventional water purification system 100 is in use, service life of the composite filter cartridge cannot be decided according to different water quality. The user can only judge when to replace the composite filter cartridge according to a predetermined service life of the composite filter cartridge. If the raw water has bad water quality, there may be a problem that the composite filter cartridge has lost efficacy and the user still uses the water purification system, which influences output water quality. If the raw water is bad in water quality, there may be a problem that the composite filter cartridge is replaced before the service life of the composite filter cartridge is reached, so the use cost is increased.

In the water purification system 100 according to embodiments of the present disclosure, by providing the water quality detecting device 70, the water quality detecting device 70 can be disposed to the raw water inlet pipe 20 to detect the water quality of the raw water, or be disposed to the pure water outlet pipe 30 to detect the water quality of the pure water, or be disposed to the raw water inlet pipe 20 and the pure water outlet pipe 30 separately.

When the water quality detecting device 70 is disposed to the raw water inlet pipe 20, the water quality detecting device 70 can detect the water quality of the raw water entering from the raw water inlet pipe 20. By disposing the water quality detecting device 70 ahead of the composite filter cartridge 10, it is possible to detect total amount of dissolved solid materials of the raw water, i.e. TDS value. By judging the water quality of the raw water, it is possible to determine the service life of the composite filter cartridge 10.

When the water quality detecting device 70 is disposed to the pure water outlet pipe 30, the water quality detecting device 70 can detect the water quality of the pure water flowing out from the pure water outlet pipe 30. By disposing the water quality detecting device 70 behind the composite filter cartridge 100, it is possible to detect filtration effect of the composite filter cartridge 10. By detecting the water quality of the pure water, it is possible to determine whether the composite filter cartridge 10 has lost efficacy.

In addition, in the water purification system 100 according to embodiments of the present disclosure, by integrating the pretreatment filter cartridge 11 and the filter membrane assembly 12 together, multi-stage filter cartridges in the existing the water purification system can be replaced, which can not only simplify the pipeline connection, facilitate the assembly and replacement, but also reduce the number of joints, thereby reducing water leakage risk points. In addition, when the pretreatment filter cartridge 11 and the filter membrane assembly 12 are integrated in the composite filter cartridge 10, it is possible to make the service life of the pretreatment filter cartridge 11 and the filter membrane assembly 12 to be consistent with each other, which eliminates an inconvenience of replacing different filter cartridges frequently and reduces the use cost significantly.

Thus, in the water purification system 100 according to embodiments of the present disclosure, by disposing the water quality detecting device 70 to the raw water inlet pipe 20 and/or the pure water outlet pipe 30, the water quality detecting device 70 can determine the service life of the composite filter cartridge 10 according to the detected water quality of the raw water, and can determine whether the composite filter cartridge 10 has lost efficacy according to the detected water quality of the pure water, so that the user can judge the use state of the water purification system 100 better and decide whether the composite filter cartridge 10 needs to be replaced. Thus, it is more convenient to use the composite filter cartridge 10, and in addition, the water purification system 100 is simple in pipeline connection and convenient to assemble and replace, and has a high user experience.

Specifically, according to an embodiment of the present disclosure, the water quality detecting device 70 includes a first water quality detector 71 disposed to the raw water inlet pipe 20 and configured to detect water quality of raw water in the raw water inlet pipe 20, and the control device is connected to the first water quality detector 71 and configured to determine the service life of the composite filter cartridge 10 according to information detected by the first water quality detector 71.

Further, in some specific embodiments of the present disclosure, the water quality detecting device 70 includes a second water quality detector 72 disposed to the pure water outlet pipe 30 and configured to detect water quality in the pure water outlet pipe 30, and the control device is connected to the second water quality detector 72 and configured to judge whether the composite filter cartridge 10 has lost efficacy according to information detected by the second water quality detector 72.

That is, the water quality detecting device 70 can be disposed to the raw water inlet pipe 20 or the pure water outlet pipe 30 in the water purification system 100 according to embodiments of the present disclosure, and determine the service life of the composite filter cartridge 10 or judge whether the composite filter cartridge 10 has lost efficacy. The water quality detecting device 70 can also be disposed to both of the raw water inlet pipe 20 and the pure water outlet pipe 30, so that not only the service life of the composite filter cartridge 10 can be determined, but also it is possible to judge whether the composite filter cartridge 10 has lost efficacy. In such a way, the user can know the use state of the composite filter cartridge 10 better.

According to an embodiment of the present disclosure, at least one of the first water quality detector 71 and the second water quality detector 72 is a conductivity sensor, and the control device is a single chip microcomputer. The conductivity sensor detects water-flow impedance and generates a frequency signal; the single chip microcomputer receives the frequency signal and determines total amount of dissolved solid materials in water flow, and the single chip microcomputer determines the service life of the composite filter cartridge or judges whether the composite filter cartridge has lost efficacy according to the total amount of dissolved solid materials.

In other words, the water quality detecting device 70 according to embodiments of the present disclosure is the conductivity sensor, and the control device is the single chip microcomputer connected to the conductivity sensor. The conductivity sensor can form different frequencies according to impedance of different water quality in the pipes. Frequency information is transmitted to the single chip microcomputer after being converted by a conversion part. Different TDS values can be calculated out by the single chip microcomputer according to different frequencies, so as to determine the service life of the composite filter cartridge or judge whether the composite filter cartridge has lost efficacy. Thus, the water quality detecting device 70 and the control device are simple in structure and convenient to mount, and have an extensive range of sources and low costs.

In some embodiments, according to an embodiment of the present disclosure, the water purification system 100 further includes a display device (not illustrated) connected to the control device configured to display the service life of the composite filter cartridge 10 and/or display whether the composite filter cartridge 10 has lost efficacy.

Specifically, the display device can be a display panel, and the display panel can display information on the TDS value of the water quality, the service life of the composite filter cartridge 10 and whether the composite filter cartridge 10 has lost efficacy. Thus, the user can view a water quality change and the use condition of the composite filter cartridge 10 more intuitively, so the user experience is better.

Further, in some specific embodiments of the present disclosure, the water purification system 100 further includes a temperature detecting device (not illustrated) connected to the water quality detecting device 70, configured to correct detection accuracy of the water quality detecting device 70. Thus, by providing the temperature detecting device, it is possible to adjust the accuracy of the water quality detecting device 70 according to a temperature change, so as to make detection information of the water quality detecting device 70 more accurate.

According to an embodiment of the present disclosure, the water purification system 100 further includes a flexible water bag 80 disposed to the pure water outlet pipe 30. Further, the water purification system 100 further includes a waste water ratio control valve 90 disposed to the waste water outlet pipe 40 and connected to the control device.

The pure water flowing out from the pure water outlet 16 can enter the flexible water bag 80 firstly, when the flexible water bag 80 is full of pure water, a micro switch or reed switch in the flexible water bag 80 sends a signal to the control device of the water purification system 100, and the control device sends the signal for closing switches of the booster pump 60 and the raw water inlet 13, so as to make the water purification system 100 stop producing water.

The waste water ratio control valve 90 is connected to the control device, the detected information on the water quality is fed back to the control device by the water quality detecting device 70, and the control device can determine the water flow speed of the waste water ratio control valve 90 according to the water quality, so as to further improve the service life of the composite filter cartridge 10 and realize a water-saving effect.

Further, as illustrated in FIG. 1, the water purification system 100 further includes a water pump 81. The water pump 81 can be disposed to the pure water outlet pipe 30, and the flexible water bag 80 can be located between the water pump 81 and the composite filter cartridge 10. When the user needs to use water, the pure water in the flexible water bag 80 can be drawn out by means of the water pump 81, which is convenient to take out the pure water stored in the flexible water bag 80, so as to be user friendly, and in addition, it is possible to further facilitate draining the pure water from the flexible water bag 80 so as to prevent the pure water from remaining in the flexible water bag 80 for a long period to cause secondary pollution.

In some specific examples of the present disclosure, the pretreatment filter cartridge 11 includes an outer filtration layer, a middle filtration layer and an inner filtration layer.

Specifically, the outer filtration layer is a PP nonwoven fabric wound layer, a folded PP nonwoven layer, a PP cotton layer or a thread-wound PP cotton layer; the middle filtration layer is an activated carbon fiber wound layer, an activated carbon rod layer, a granular activated carbon layer or a pickled activated carbon layer; and the inner filtration layer is a microfiltration layer or an ultrafiltration layer.

For example, the pretreatment filter cartridge 11 can include a PP cotton outer layer of 5 micrometers, an activated carbon rod middle layer, and a PP cotton inner layer of 1 micrometer. The pretreatment filter cartridge 11 can also include a thread-wound PP outer layer, the activated carbon rod middle layer and an ultrafiltration inner layer, and the pretreatment filter cartridge 11 may also include the PP cotton outer layer, the activated carbon rod middle layer and the ultrafiltration inner layer.

As illustrated in FIG. 2, the filter membrane assembly 12 may include a central water collecting pipe 121 and a filter membrane 122 wound upon the central water collecting pipe 121. The filter membrane 122 may be a reverse osmosis membrane, an ultrafiltration membrane or a nanofiltration membrane. Thus, the pretreated water can be further filtered by means of the filter membrane 122, and the purified pure water can be delivered to the pure water outlet 16 through the central water collecting pipe 121, while concentrated water, outside the central water collecting pipe 121, can be discharged out of the composite filter cartridge 10 through a concentrated water outlet 17.

Other configurations and operations of the water purification system 100 according to embodiments of the present disclosure are known to those skilled in the related art, which will not be described in detail herein.

In the specification, it should be understood that relative terms such as "central", "longitudinal", "lateral", "length", "width", "thickness", "front", "rear", "right", "left", "horizontal", "vertical", "top", "bottom", "inner", "outer" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. Thus the relative terms cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are illustrative and cannot be construed to limit the present disclosure, and changes, alternatives, variation and modifications can be made in the embodiments without departing from principles and purposes of the present disclosure by those ordinarily skilled in the related art.

What is claimed is:

1. A water purification system, comprising:
  a composite filter cartridge comprising a pretreatment filter cartridge and a filter membrane assembly inserted into the pretreatment filter cartridge, the composite filter cartridge being provided with a raw water inlet, a pretreated water outlet connected to the pretreatment filter cartridge, a pretreated water inlet connected to the filter membrane assembly, a pure water outlet and a waste water outlet;
  a raw water inlet pipe connected to the raw water inlet;
  a pure water outlet pipe connected to the pure water outlet;
  a waste water outlet pipe connected to the waste water outlet;
  a pretreated water pipe connected to the pretreated water outlet and the pretreated water inlet, respectively;
  a booster pump connected to the pretreated water pipe;
  a first conductivity sensor connected to the raw water inlet pipe and a second conductivity sensor connected to the pure water outlet pipe, wherein each of the first conductivity sensor and the second conductivity sensor is configured to detect a water flow impedance and generate a frequency signal according to the water flow impedance; and
  a single chip microcomputer that is electrically connected to the first conductivity sensor and the second conductivity sensor and configured to receive the frequency signals from the first conductivity sensor and the second conductivity sensor, determine a total amount of dissolved solid materials in the water flow according to the frequency signals, and determine a remaining service life of the composite filter cartridge according to the total amount of dissolved solid materials and a predetermined service life of the composite filter cartridge.

2. The water purification system according to claim 1, further comprising a display device connected to the single chip microcomputer configured to display the remaining service life of the composite filter cartridge.

3. The water purification system according to claim 1, further comprising a flexible water bag disposed to the pure water outlet pipe.

4. The water purification system according to claim 1, further comprising a waste water ratio control valve disposed to the waste water outlet pipe and connected to the single chip microcomputer.

5. The water purification system according to claim 1, wherein the filter membrane assembly comprises a central water collecting pipe, and one selected from the group consisting of a reverse osmosis membrane, an ultrafiltration membrane and a nanofiltration membrane wound upon the central water collecting pipe.

* * * * *